United States Patent
Zhang et al.

(10) Patent No.: US 10,856,003 B2
(45) Date of Patent: Dec. 1, 2020

(54) CODING AFFINE PREDICTION MOTION INFORMATION FOR VIDEO CODING

(71) Applicant: QUALCOMM Incorporated, San Diego, CA (US)

(72) Inventors: Kai Zhang, San Diego, CA (US);
Jianle Chen, San Diego, CA (US);
Xiang Li, Los Gatos, CA (US);
Wei-Jung Chien, San Diego, CA (US);
Yi-Wen Chen, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/148,738

(22) Filed: Oct. 1, 2018

(65) Prior Publication Data
US 2019/0104319 A1   Apr. 4, 2019

Related U.S. Application Data

(60) Provisional application No. 62/567,598, filed on Oct. 3, 2017.

(51) Int. Cl.
*H04B 1/66* (2006.01)
*H04N 7/12* (2006.01)
(Continued)

(52) U.S. Cl.
CPC .......... *H04N 19/52* (2014.11); *H04N 19/105* (2014.11); *H04N 19/137* (2014.11); *H04N 19/176* (2014.11); *H04N 19/54* (2014.11)

(58) Field of Classification Search
CPC ..... H04N 19/52; H04N 19/137; H04N 19/176
See application file for complete search history.

(56) References Cited

U.S. PATENT DOCUMENTS

| 2009/0232215 A1* | 9/2009 | Park | H04N 19/52 375/240.16 |
|---|---|---|---|
| 2013/0243088 A1* | 9/2013 | Lim | H04N 19/52 375/240.12 |

(Continued)

FOREIGN PATENT DOCUMENTS

CA           3013655 A1      8/2017

OTHER PUBLICATIONS

Huang, et al. "Control-point representation and differential coding affine-motion compensation." IEEE Transactions on Circuits and Systems for Video Technology 23.10 (2013)1651-1660 (Year: 2013).*

(Continued)

*Primary Examiner* — Fabio S Lima
(74) *Attorney, Agent, or Firm* — Shumaker & Sieffert, P.A.

(57) ABSTRACT

An example device for coding video data includes a memory configured to store video data, and one or more processors implemented in circuitry and configured to code a first motion vector difference (MVD) representing a difference between a first motion vector of a current block of video data predicted using affine prediction and a first motion vector predictor (MVP) for the first motion vector, predict a second MVD from the first MVD for a second motion vector of the current block, and code the current block using affine prediction according to the first motion vector and the second motion vector. Predicting the second MVD from the first MVD in this may reduce bitrate of a bitstream including coded video data, as well as improve processing efficiency.

30 Claims, 12 Drawing Sheets

(51) Int. Cl.
*H04N 11/02* (2006.01)
*H04N 11/04* (2006.01)
*H04N 19/52* (2014.01)
*H04N 19/176* (2014.01)
*H04N 19/54* (2014.01)
*H04N 19/137* (2014.01)
*H04N 19/105* (2014.01)

(56) References Cited

U.S. PATENT DOCUMENTS

| | | | |
|---|---|---|---|
| 2013/0294518 A1* | 11/2013 | Lim | H04N 19/46 |
| | | | 375/240.16 |
| 2016/0134886 A1* | 5/2016 | Chen | H04N 19/52 |
| | | | 375/240.08 |
| 2017/0332095 A1 | 11/2017 | Zou et al. | |
| 2018/0098063 A1 | 4/2018 | Chen et al. | |
| 2019/0075298 A1* | 3/2019 | Lofgren | H04N 19/139 |
| 2020/0029085 A1* | 1/2020 | Xu | H04N 19/44 |

OTHER PUBLICATIONS

Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (the Joint Video Exploration Team of ISO/IEC JTC1/SC29/WG11 and ITU-T SG.16); URL: http://phenix.int-evry.fr/jvet/, pp. 1-43.

Chia-Hung Y., et al., "Second Order Residual Prediction for HEVC Inter Coding," Signal and Information Processing Association Annual Summit and Conference (APSIPA), 2014 Asia-Pacific, Asia-Pacific Signal and Information Processing ASS, Dec. 9, 2014, pp. 1-4, XP032736611, DOI: 10.1109/APSIPA.2014.7041747 [retrieved on Feb. 12, 2015].

Flynn D., et al., "High Efficiency Video Coding (HEVC) Range Extensions text specification: Draft 6", Joint collaborative Team on Video Coding (JCT-VC) of ITU-T SG 16 WP 3 and ISO/IEC JTC 1/SC 29/WG 11, 16th Meeting: San José, US, Jan. 9-17, 2014, JCTVC-P1005_v4, 357 pages.

Han H., et al., "Control-Point Representation and Differential Coding Affine-Motion Compensation," IEEE Transactions on Circuits and Systems for Video Technology, Institute of Electrical and Electronics Engineers, US, vol. 23 (10), Oct. 1, 2013, pp. 1651-1660, XP011528531, ISSN: 1051-8215, DOI: 10.1109/TCSVT.2013.2254977 [retrieved on Sep. 30, 2013].

Han Y., et al., "CE4.1.3: Affine Motion Compensation Prediction", Joint Video Exploration Team (JVET) of ITU-T SG 16 WP 3 and ISO/IEC JTC 1/SC 29/WG 11, 11th Meeting: Ljubljana, SI, Jul. 10-18, 2018, JVET-K0337, 6 pages.

Huawei Technologies: "Affine Transform Prediction for Next Generation Video Coding," ITU-T SG16 Meeting; Oct. 12-23, 2015; Geneva, No. T13-SG16-C-1016, Sep. 29, 2015, XP030100743, 11 pages.

International Search Report and Written Opinion—PCT/US2018/053936—ISA/EPO—dated Jan. 18, 2019—20 pp.

ITU-T H.265, "Series H: Audiovisual and Multimedia Systems, Infrastructure of audiovisual services—Coding of moving video, High efficiency video coding," The International Telecommunication Union. Dec. 2016, 664 pp.

Lin S., et al., "Affine Transform Prediction for Next Generation Video Coding", Huawei Technologies, International Organisation for Standardisation Organisation Internationale De Normalisation ISO/IEC JTC1/SC29/WG11 Coding of Moving Pictures and Audio, ISO/IEC JTC1/SC29/WG11 MPEG2015/m37525, Geneva, Switzerland, Oct. 2015, 10 Pages.

Wang., et al., "High Efficiency Video Coding (HEVC) Defect Report 2," Joint Collaboration Team of Video Coding, ITU-T SG 16 WP 3 and ISO/IEC JTC 1/SC 29/WG 11, 15th Meeting, Geneva, CH, Oct. 23-Nov. 1, 2013, Document: JCTVC-01003_V2, 311 pages.

* cited by examiner

CODING AFFINE PREDICTION MOTION INFORMATION FOR VIDEO CODING

This application claims the benefit of U.S. Provisional Application No. 62/567,598, filed Oct. 3, 2017, the entire contents of which are hereby incorporated by reference.

TECHNICAL FIELD

This disclosure relates to video coding, and more particularly, to coding motion information of video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to inter-picture prediction. For example, the techniques of this disclosure include motion vector coding (encoding and/or decoding) for affine motion compensation in block-based video coding. These techniques may be applied to existing and/or future video coding standards.

In one example, a method of coding (e.g., encoding or decoding) video data includes coding a first motion vector difference (MVD) representing a difference between a first motion vector of a current block of video data predicted using affine prediction and a first motion vector predictor (MVP) for the first motion vector, predicting a second MVD from the first MVD for a second motion vector of the current block, and coding the current block using affine prediction according to the first motion vector and the second motion vector.

In another example, a device for coding (e.g., encoding or decoding) video data includes a memory configured to store video data, and one or more processors implemented in circuitry and configured to code a first motion vector difference (MVD) representing a difference between a first motion vector of a current block of video data predicted using affine prediction and a first motion vector predictor (MVP) for the first motion vector, predict a second MVD from the first MVD for a second motion vector of the current block, and code the current block using affine prediction according to the first motion vector and the second motion vector.

In another example, a computer-readable storage medium has stored thereon instructions that, when executed, cause a processor to code a first motion vector difference (MVD) representing a difference between a first motion vector of a current block of video data predicted using affine prediction and a first motion vector predictor (MVP) for the first motion vector, predict a second MVD from the first MVD for a second motion vector of the current block, and code the current block using affine prediction according to the first motion vector and the second motion vector.

In another example, a device for coding (e.g., encoding or decoding) video data includes means for coding a first motion vector difference (MVD) representing a difference between a first motion vector of a current block of video data predicted using affine prediction and a first motion vector predictor (MVP) for the first motion vector, means for predicting a second MVD from the first MVD for a second motion vector of the current block, and means for coding the current block using affine prediction according to the first motion vector and the second motion vector.

The details of one or more examples are set forth in the accompanying drawings and the description below. Other features, objects, and advantages will be apparent from the description and drawings, and from the claims.

DETAILED DESCRIPTION

Figure 1B:
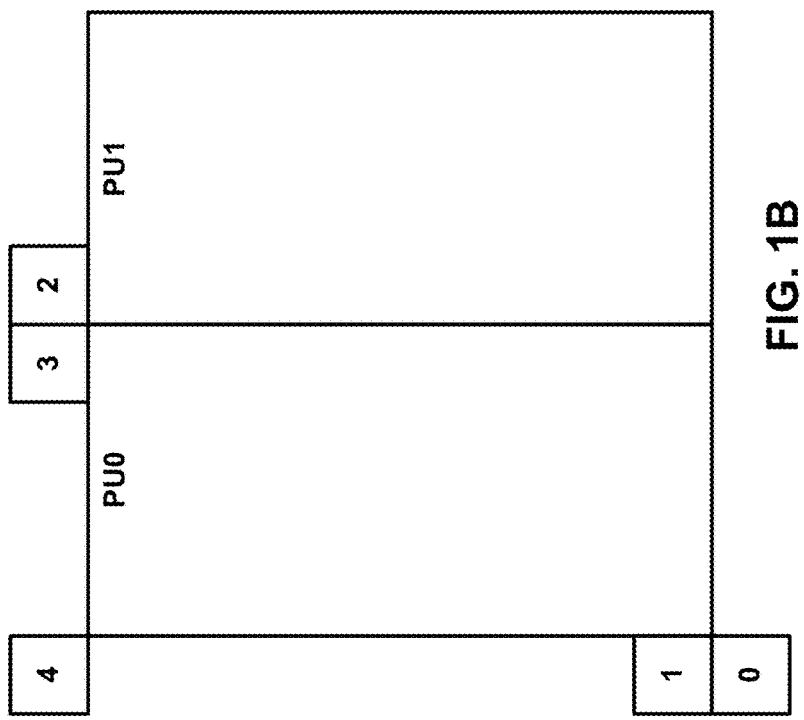
FIGS. 1A and 1B are conceptual diagrams illustrating examples of spatial neighboring candidates for merge and advanced motion vector prediction (AMVP) modes of High Efficiency Video Coding (HEVC).

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Recently, the design of a new video coding standard, namely ITU-T H.265/High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from phenix.int-evry.fr/jct/doc_end_user/documents/15_Geneva/wg11/JCTVC-O1003-v2.zip. The Range Extensions to HEVC, namely HEVC-Rext, is also being developed by the JCT-VC. A Working Draft (WD) of Range extensions, referred to as RExt WD6 hereinafter, is available from phenix.int-evry.fr/jct/doc_end_user/documents/16_San%20Jose/wg11/JCTVC-P1005-v1.zip.

Investigations of new coding tools for future video coding are ongoing (e.g., as studied in JVET-Joint Video Exploration Team), and technologies that improve the coding efficiency for video coding have been proposed. There is evidence that significant improvements in coding efficiency can be obtained by exploiting the characteristics of video content, especially for high resolution content like 4K, with novel dedicated coding tools beyond H.265/HEVC. Companies and organizations have been invited to submit proposals in the exploration stage for possible further improvement of video coding efficiency.

In H.265/HEVC, for each block, a set of motion information may be available. A set of motion information may contain motion information for forward and backward prediction directions. Forward and backward prediction directions are two prediction directions of a bi-directional prediction mode and the terms "forward" and "backward" do not necessarily have a geometry meaning, instead they correspond to reference picture list 0 (RefPicList0) and reference picture list 1 (RefPicList1) of a current picture. When only one reference picture list is available for a picture or slice, only RefPicList0 is available and the motion information of each block of a slice is always forward.

For each prediction direction, according to H.265/HEVC, the motion information must contain a reference index and a motion vector. In some cases, for simplicity, a motion vector itself may be referred to in a way that it is assumed that the motion vector has an associated reference index. A reference index is used to identify a reference picture in the current reference picture list (RefPicList0 or RefPicList1). A motion vector has a horizontal and a vertical component.

Picture order count (POC) is widely used in video coding standards to identify a display order of a picture. Although there are cases in which two pictures within one coded video sequence may have the same POC value, this typically does not happen within a coded video sequence. When multiple coded video sequences are present in a bitstream, pictures with a same value of POC may be closer to each other in terms of decoding order. POC values of pictures are typically used for reference picture list construction, derivation of reference picture set as in HEVC, and motion vector scaling.

In HEVC, the largest coding unit in a slice is called a coding tree block (CTB). A CTB contains a quad-tree, nodes of which are coding units. The size of a CTB can range from 16×16 pixels to 64×64 pixels in the HEVC main profile (although technically 8×8 CTB sizes can be supported). A coding unit (CU) could be the same size of a CTB, and as small as 8×8 pixels. Each coding unit may be coded with one mode. When a CU is inter coded, it may be further partitioned into two or more prediction units (PUs), or become just one PU when further partition does not apply. When two PUs are present in one CU, they can be half size rectangles or two rectangle size with ¼ or ¾ size of the CU. When the CU is inter coded, one set of motion information is present for each PU. In addition, each PU is coded with a unique inter-prediction mode to derive the set of motion information. In HEVC, the smallest PU sizes are 8×4 and 4×8.

In HEVC, there are two inter prediction modes, named merge (skip is considered as a special case of merge) and advanced motion vector prediction (AMVP) modes, for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list, per HEVC, contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with a motion vector predictor (MVP) index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Figure 1A:
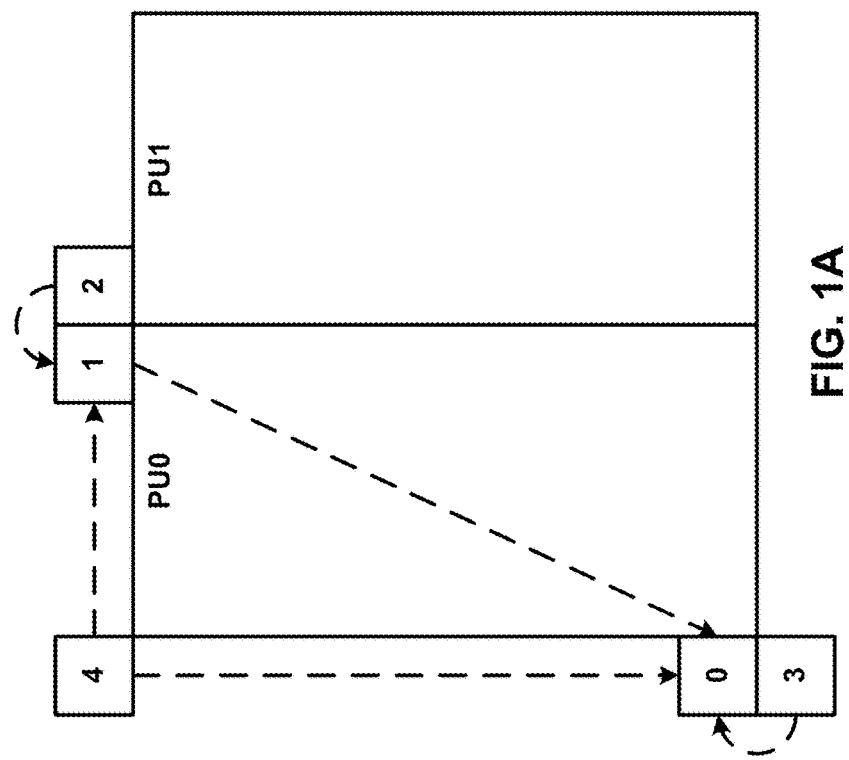

FIGS. 1A and 1B are conceptual diagrams illustrating examples of spatial neighboring candidates for merge and AMVP modes of HEVC. In particular, FIG. 1A illustrates spatial neighboring motion vector (MV) candidates for merge mode, while FIG. 1B illustrates spatial neighboring MV candidates for AMVP mode. According to HEVC, spatial MV candidates are derived from the neighboring blocks shown in FIGS. 1A and 1B, for a specific PU ($PU_0$), although the techniques for generating the candidates from the blocks differ for merge and AMVP modes.

In merge mode of HEVC, up to four spatial MV candidates can be derived with the orders showed in FIG. 1A with numbers, and the order is the following: left (0), above (1), above right (2), below left (3), and above left (4), as shown in FIG. 1A.

In AVMP mode of HEVC, the neighboring blocks are divided into two groups: a left group including blocks 0 and 1, and an above group including blocks 2, 3, and 4 as shown in FIG. 1B. For each group, the potential candidate in a neighboring block referring to the same reference picture as that indicated by the signaled reference index has the highest priority to be chosen to form a final candidate of the group. It is possible that no neighboring blocks contain a motion vector pointing to the same reference picture. Therefore, if such a candidate cannot be found, the first available candidate will be scaled to form the final candidate. Thus, the temporal distance differences can be compensated.

Motion compensation in H.265/HEVC is used to generate a predictor for a current inter-coded block. A quarter pixel accuracy motion vector may be used, and pixel values at fractional positions may be interpolated using neighboring integer pixel values for both luma and chroma components.

Figure 2:
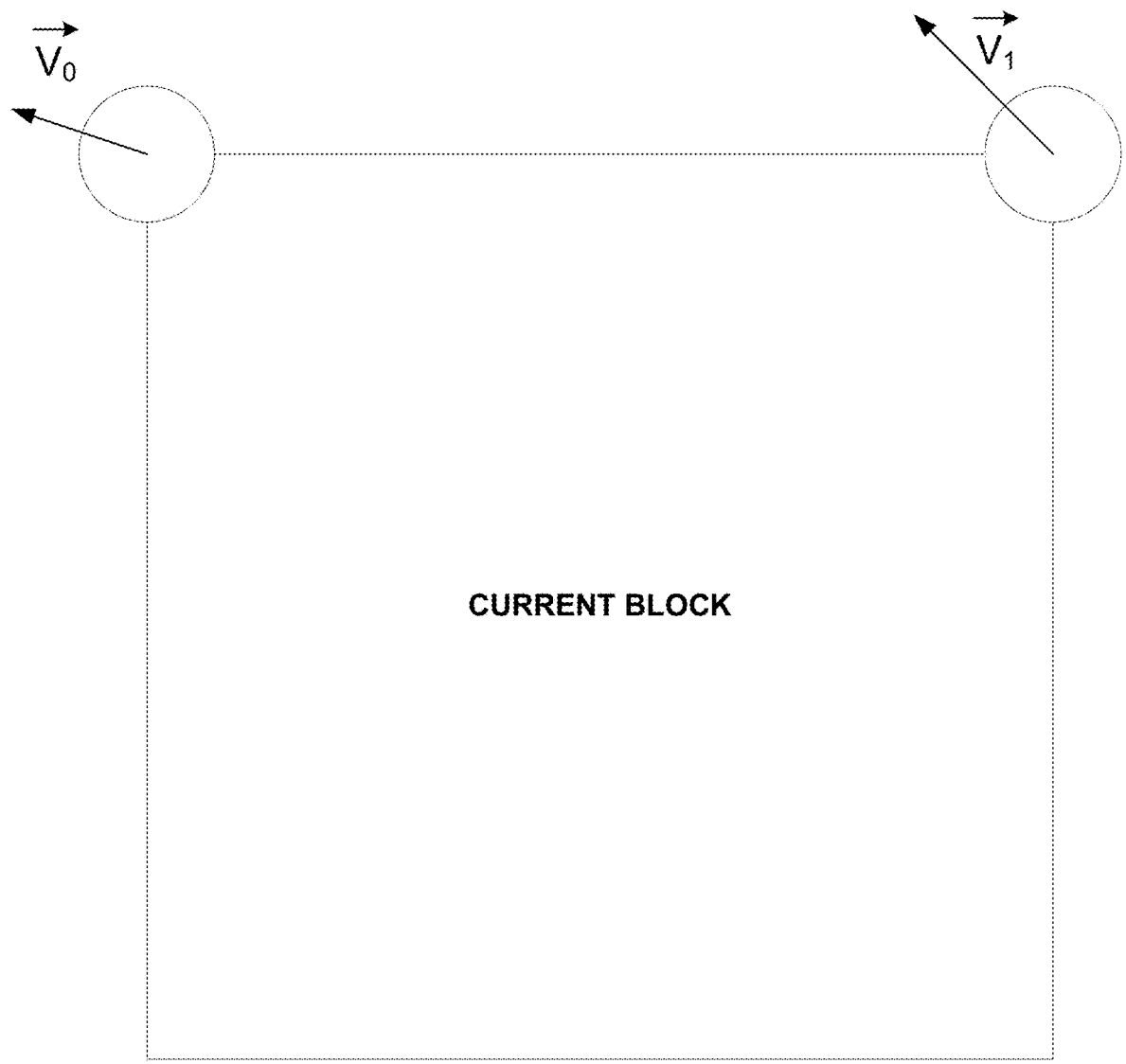
FIG. 2 is a conceptual diagram illustrating an example two point motion vector affine with four affine parameters for a current block.

FIG. 2 is a conceptual diagram illustrating an example two point motion vector affine with four affine parameters for a current block. In the current existing video codec standards, only a translational motion model is applied for motion compensation prediction (MCP). However, in the real world, there are many kinds of motions, e.g., zoom in/out, rotation, perspective motions and the other irregular motions. If only a translation motion model for MCP is applied in such test sequences with irregular motions, it will affect the prediction accuracy and result in low coding efficiency. For many years, many video experts have tried to design many algorithms to improve MCP for higher coding efficiency. Affine merge and affine inter (AMVP) modes have been proposed to deal with affine motion models with 4 parameters as:

$$\begin{cases} V_x = ax + by + e \\ V_y = cx + dy + f \end{cases} \quad (1)$$

In equation (1) above, $(vx_0, vy_0)$ is the control point motion vector at the top left corner of the current block of FIG. 2, and $(vx_1, vy_1)$ is another control point motion vector at the above right corner of the current block of FIG. 2. The affine model boils down to:

$$\begin{cases} V_x = \frac{(v_{1x} - v_{0x})}{w} x + \frac{(v_{2x} - v_{0x})}{h} y + v_{0x} \\ V_y = \frac{(v_{1y} - v_{0y})}{w} x + \frac{(v_{2y} - v_{0y})}{h} y + v_{0y} \end{cases} \quad (2)$$

In the current JEM software, the affine motion prediction is only applied to square blocks. As a natural extension, the affine motion prediction can be applied to non-square blocks.

Figure 3:
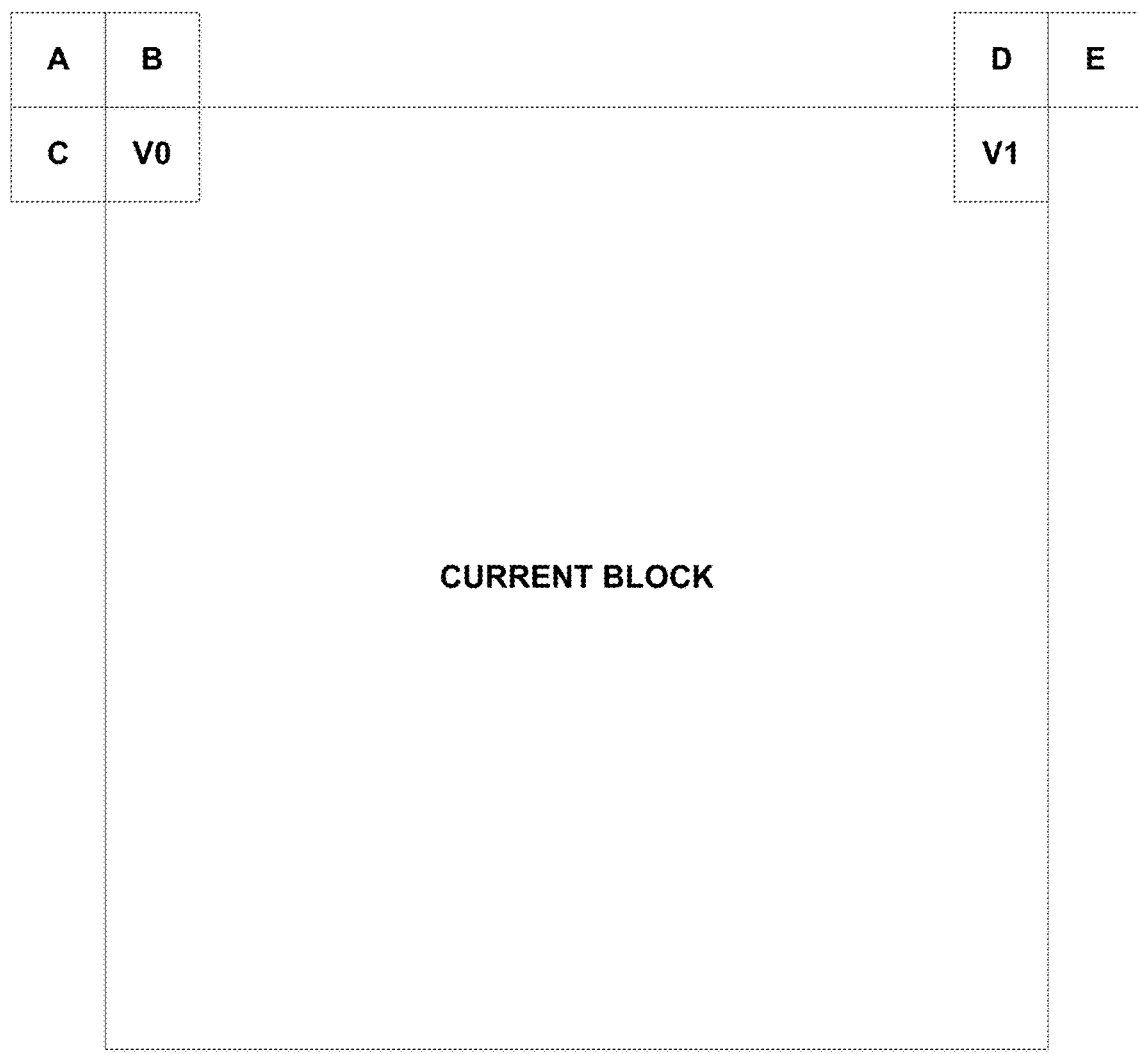
FIG. 3 is a conceptual diagram illustrating an example of affine inter-prediction mode for a current block.

FIG. 3 is a conceptual diagram illustrating an example of affine inter-prediction mode for a current block. The current block may be a current CU or current PU. In this example, the current block includes two blocks labeled "V0" at an upper-left corner and "V1" at an upper-right corner, and neighboring blocks labeled A, B, C, D, and E. In particular, the "V0" block neighbors blocks A, B, and C, while the "V1" block neighbors blocks D and E.

For every CU/PU whose size is equal to or larger than 16×16, affine inter-prediction mode (AF_INTER mode) can be applied as follows. If the current CU/PU is in AF_INTER mode, an affine flag in CU/PU level may be signaled in the bitstream. A candidate list $\{(v_0, v_1) | v_0 = \{v_A, v_B, v_C\}, v_1 = \{v_D, v_E\}\}$ is built using the neighbor valid reconstructed blocks.

As shown in FIG. 3, motion information $v_0$ is selected from the motion vectors of blocks A, B, and/or C. The motion vector from the neighbor block is scaled according to the reference list and the relationship among the POC of the reference for the neighbor block, the POC of the reference for the current CU/PU and the POC of the current CU/PU. And the approach to select $v_1$ from neighbor blocks D and E is similar. If the number of candidate list is smaller than 2, the candidates of AMVP are assigned to $v_0$ and $v_1$. A rate distortion optimization (RDO) cost of the current CU/PU is used to determine which $(v_0, v_1)$ is selected as the control point motion vector prediction (CPMVP) of the current CU/PU. And the index to indicate the position of the CPMVP in the candidate list is signaled in the bit stream.

After the CPMVP of the current affine CU/PU is determined, affine motion estimation is applied and the CPMV is found. Then the difference of the CPMV and the CPMVP is coded in the bit stream. Affine motion compensation prediction mentioned above is applied to generate the residues of the current CU/PU. Finally, the residues of the current CU/PU are transformed, quantized, and coded into the bit stream, according to conventional procedures.

Figure 4A:
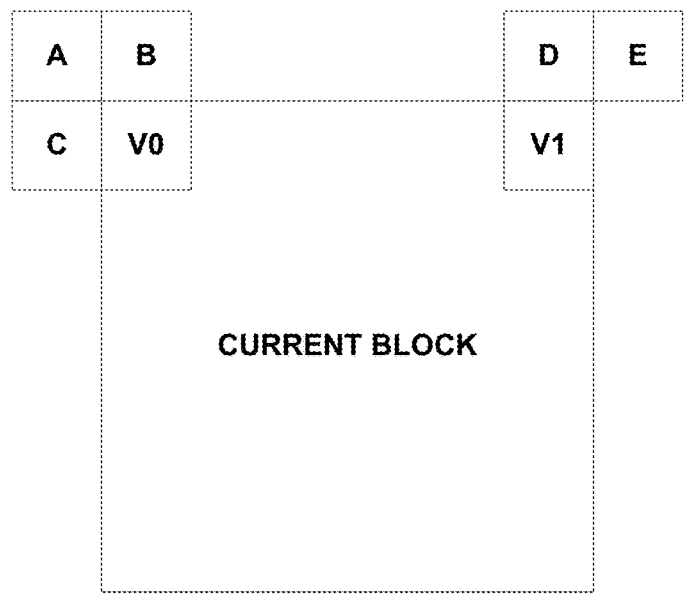
FIGS. 4A and 4B are conceptual diagrams illustrating an example of affine merge mode for a current block.
Figure 4B:
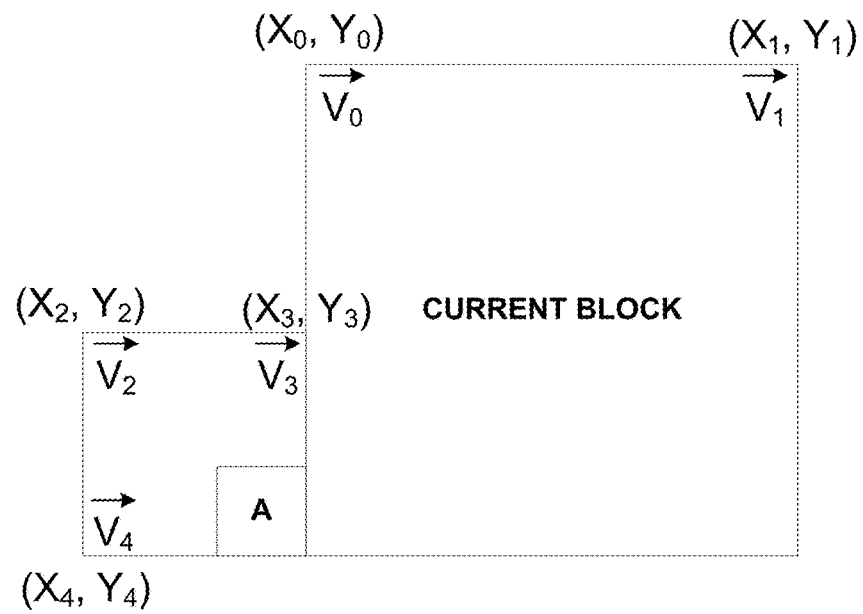

FIGS. 4A and 4B are conceptual diagrams illustrating an example of affine merge mode for a current block. The current block may be a current CU or current PU. In this example, the current block has five neighboring blocks, labeled A, B, C, D, and E, as shown in FIG. 4A.

When the current CU/PU is applied in affine merge mode (AF_MERGE mode), it gets the first block coded with affine mode from the valid neighbor reconstructed blocks of A, B, C, D, and E. The selection order for the candidate block is from left, above, above right, left bottom, to above left, as shown in FIG. 4A. For example, if the neighbor left bottom block A is coded in affine mode as shown in FIG. 4B, the motion vectors $v_2$, $v_3$ and $v_4$ of the top left corner, above right corner, and left bottom corner of the CU/PU which contains the block A are derived. The motion vector $v_0$ of the top left corner on the current CU/PU is calculated according to $v_2$, $v_3$ and $v_4$. Similarly, the motion vector $v_1$ of the above right of the current CU/PU is calculated based on $v_2$, $v_3$, and $v_4$.

After the CPMV of the current CU/PU $v_0$ and $v_1$ are calculated, according to the simplified affine motion model defined in equation (2) above, the MVF of the current CU/PU is generated. Then, Affine MCP is applied. In order to identify whether the current CU/PU is coded with AF_MERGE mode, an affine flag is signaled in the bit stream when there is at least one neighbor block coded in affine mode. If no affine block neighbor the current block exists as shown in FIG. 4A, no affine flag is written in the bit stream.

In HEVC, context adaptive binary arithmetic coding (CABAC) includes a binarization process that is used to convert a symbol into a binarized value. Binarization enables efficient binary arithmetic coding via a unique mapping of non-binary syntax elements to a sequence of bits, which are called bins. In JEM2.0 reference software, for affine merge mode, only the affine flag is coded, and the merge index is inferred to be the first available neighboring affine model in the predefined checking order A→B→C→D→E. For the affine inter mode, two MVD syntaxes are coded for each prediction list, indicating the motion vector difference between derived affine motion vector and predicted motion vector.

Figure 5:
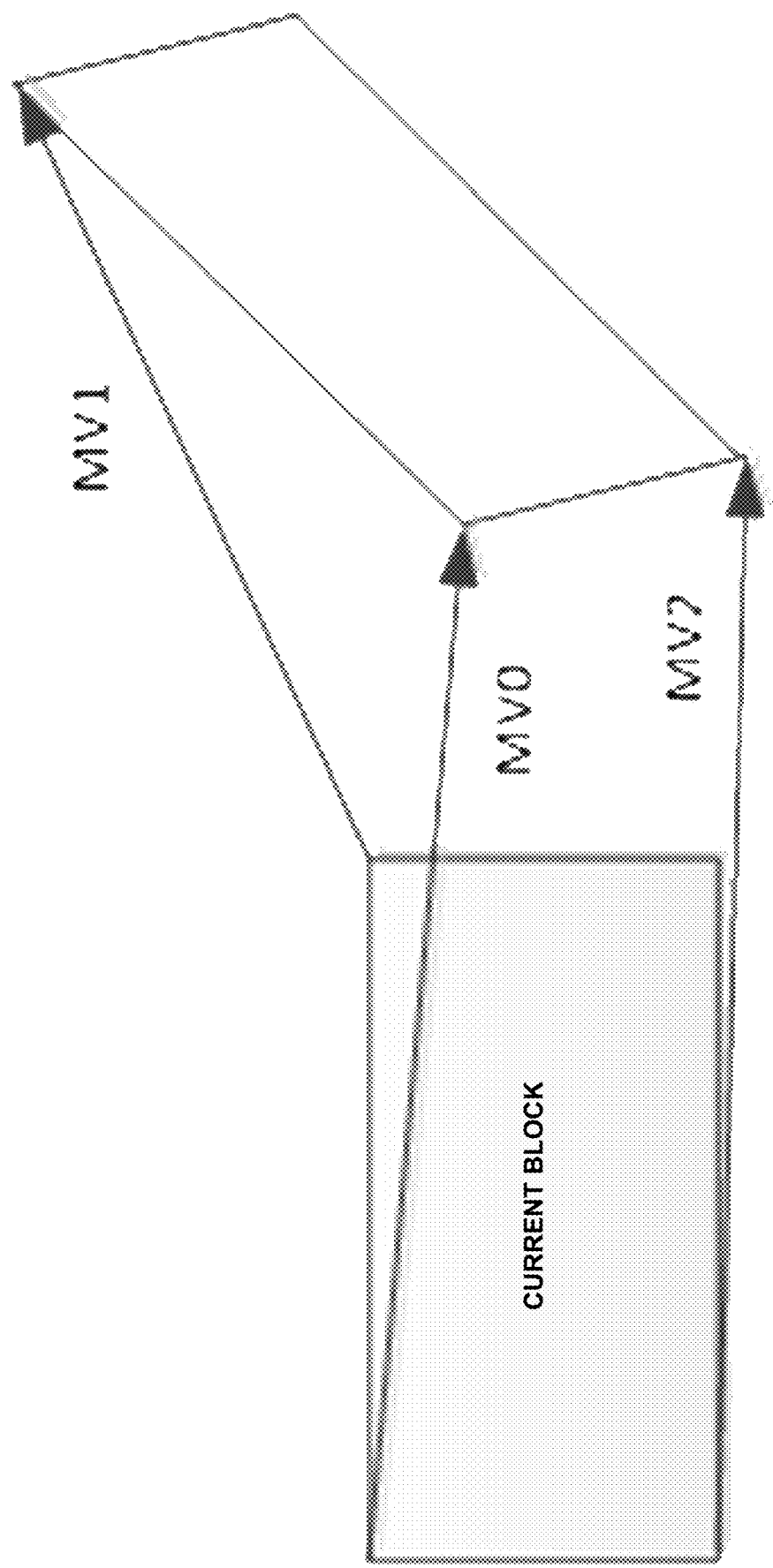
FIG. 5 is a conceptual diagram illustrating an example affine model with six parameters (three motion vectors).

FIG. 5 is a conceptual diagram illustrating an example affine model with six parameters (three motion vectors). In Zou et al., "AFFINE MOTION PREDICTION FOR VIDEO CODING," U.S. application Ser. No. 15/587,044, filed May 4, 2017, a switchable affine motion prediction scheme was described. A block with affine prediction can use a four-parameter affine model or a six-parameter affine model adaptively. An affine model with six parameters may be defined as:

$$\begin{cases} mv_x = ax + by + e \\ mv_y = cx + dy + f \end{cases} \quad (3)$$

An affine model with 6 parameters has three control points. In other words, an affine model with six parameters is determined by three motion vectors (MV0, MV1, and MV2), e.g., as shown in FIG. 5. MV0 is the first control point motion vector at the top left corner of a current block, MV1 is the second control point motion vector at the above right corner of the current block, and MV2 is the third control point motion vector at the left bottom corner of the current block, as shown in FIG. 5. The affine model built with the three motion vectors is calculated as:

$$\begin{cases} mv_x = \frac{(mv_{1x} - mv_{0x})}{w} x + \frac{(mv_{2x} - mv_{0x})}{w} y + mv_{0x} \\ mv_y = \frac{(mv_{1y} - mv_{0y})}{w} x + \frac{(mv_{2y} - mv_{0y})}{w} y + mv_{0y} \end{cases} \quad (4)$$

Equation (4) above is for a square block having sides equal to w. For a non-square block (e.g., a rectangular block) having a width of w and a height of h, the following affine model may be used:

$$\begin{cases} mv_x = \frac{(mv_{1x} - mv_{0x})}{w} x + \frac{(mv_{2x} - mv_{0x})}{h} y + mv_{0x} \\ mv_y = \frac{(mv_{1y} - mv_{0y})}{w} x + \frac{(mv_{2y} - mv_{0y})}{h} y + mv_{0y} \end{cases} \quad (5)$$

A similar manner as affine-merge to derive the motion vectors of the top left corner and the above right corner as described with respect to FIG. 4 above can also be used to derive the MVPs for the top left corner, the above right corner and the below left corner. Additional examples are described in Chen et al., "MOTION VECTOR PREDICTION FOR AFFINE MOTION MODEL," U.S. Provisional Application No. 62/404,719, filed Oct. 5, 2016.

Figure 6:
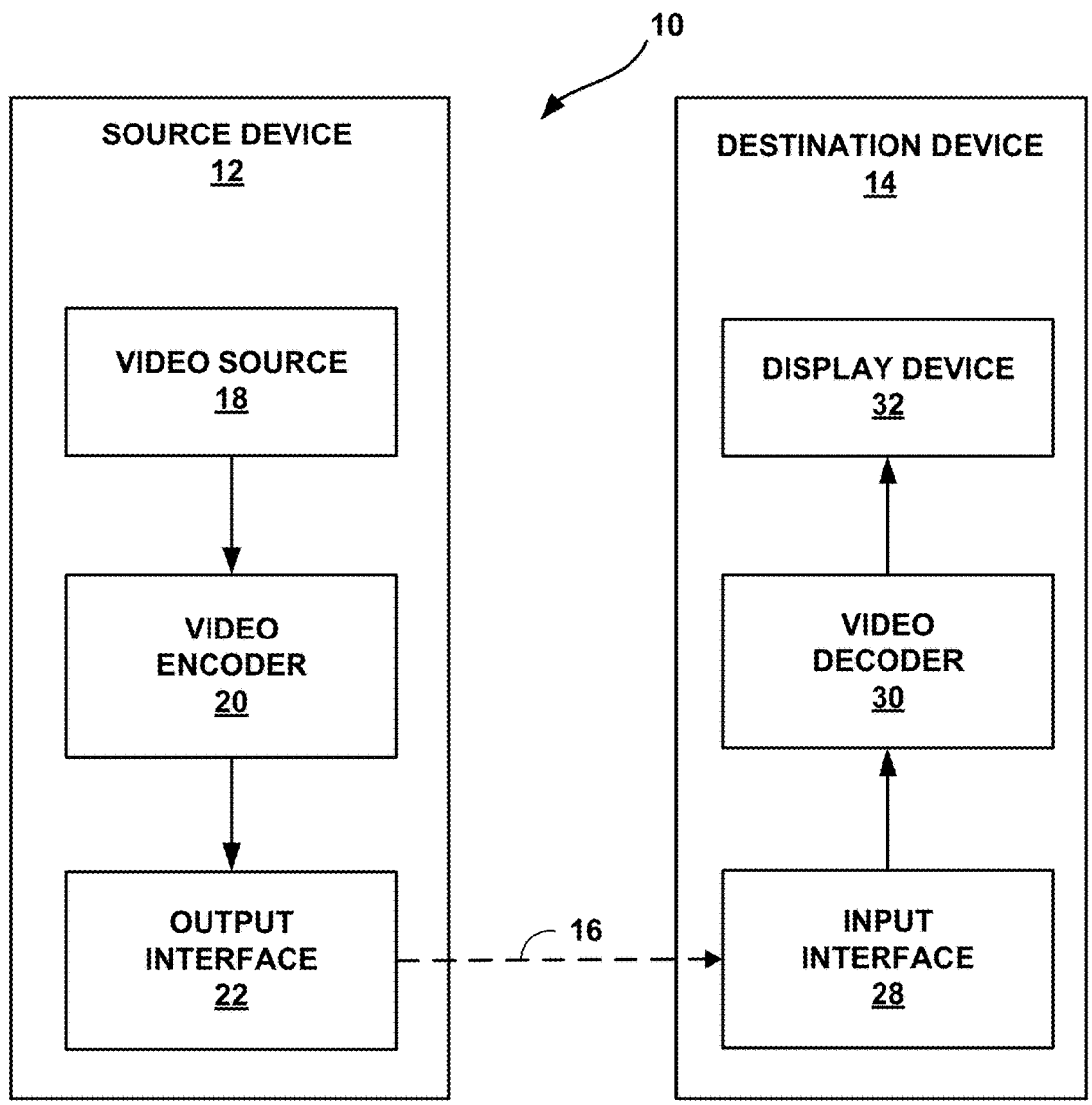
FIG. 6 is a block diagram illustrating an example video encoding and decoding system that may utilize techniques of this disclosure for efficiently coding motion information for affine prediction.

FIG. 6 is a block diagram illustrating an example video encoding and decoding system 10 that may utilize techniques of this disclosure for efficiently coding motion information for affine prediction. As shown in FIG. 6, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 6, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for efficiently coding motion information for affine prediction. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 6 is merely one example. Techniques for efficiently coding motion information for affine prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 6, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, according to ITU-T H.265, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs (or partitions of a CU) within a given CU defined for a partitioned CTU, although this may not always be the case. The TUs are typically the same size or smaller than the PUs (or partitions of a CU, e.g., in the case of intra prediction). In some examples, residual samples corresponding to a CU may be subdivided into smaller units using a quadtree structure known as a "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs) when predicted using inter-prediction. In general, a PU represents a spatial area corresponding to all or a portion of the corresponding CU, and may include data for retrieving and/or generating a reference sample for the PU. Moreover, a PU includes data related to prediction. When the CU is inter-mode encoded, one or more PUs of the CU may include data defining motion information, such as one or more motion vectors, or the PUs may be skip mode coded. Data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

Leaf-CUs may also be intra-mode predicted. In general, intra prediction involves predicting a leaf-CU (or partitions thereof) using an intra-mode. A video coder may select a set of neighboring, previously coded pixels to the leaf-CU to use to predict the leaf-CU (or partitions thereof).

A leaf-CU may also include one or more transform units (TUs). The transform units may be specified using an RQT (also referred to as a TU quadtree structure), as discussed above. For example, a split flag may indicate whether a leaf-CU is split into four transform units. Then, each TU may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, partitions of a CU, or the CU itself, may be collocated with a corresponding leaf-TU for the CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random access point (RAP) picture. A video sequence may include syntax data in a sequence parameter set (SPS) that characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

In general, video encoder 20 and video decoder 30 may be configured to more efficiently code (encode or decode, respectively) motion information for affine prediction, according to the techniques of this disclosure. Video encoder 20 and/or video decoder 30 may be configured to apply any of the various techniques discussed below, alone or in any combination.

In some examples, video encoder 20 and/or video decoder 30 may use the motion vector difference (MVD) of one motion vector (MV) to predict the MVD of another MV in a block predicted with affine prediction. The MVD may be defined as the difference between the MV and motion vector prediction (MVP): MVD=MV−MVP. More specifically, if a motion vector ($MV_x$, $MV_y$) is denoted by its horizontal component ($MV_x$) and vertical component ($MV_y$), and the motion vector predictor has components ($MVP_x$, $MVP_y$) the horizontal (vertical) component of MVD is defined as the difference of the horizontal (vertical) components of MV and MVP, respectively. Thus, the MVD may be defined as ($MVD_x$, $MVD_y$), where $MVD=MV_x-MVP_x$, and $MVD_y=MV_y-MVP_y$.

Figure 9:
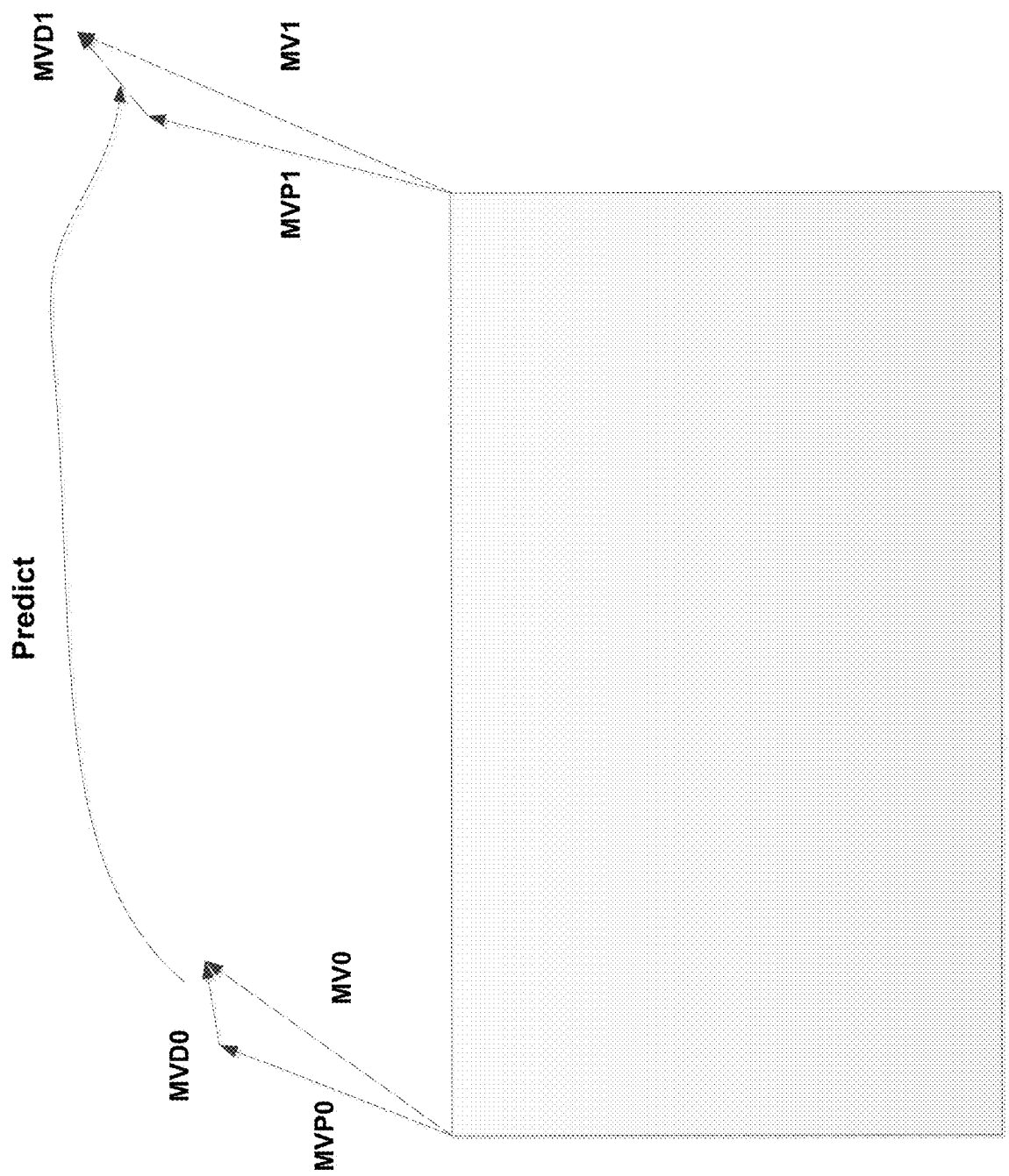
FIG. 9 is a conceptual diagram illustrating an example of motion vector difference (MVD) prediction for affine motion information prediction.

Additionally or alternatively, in some examples, video encoder 20 and/or video decoder 30 may be configured to use the MVD of the first MV to predict the MVD(s) of one or more other MVs in affine prediction. FIG. 9 is a conceptual diagram illustrating an example of such MVD prediction. In some examples, video encoder 20 and/or video decoder 30 may be configured to use the MVD of a first MV to predict the MVD of a second MV in affine prediction (e.g., 4-parameter affine). FIG. 9 below shows an example of MVD prediction for affine prediction with two motion vectors, where MVD1 is predicted by MVD0.

Figure 10:
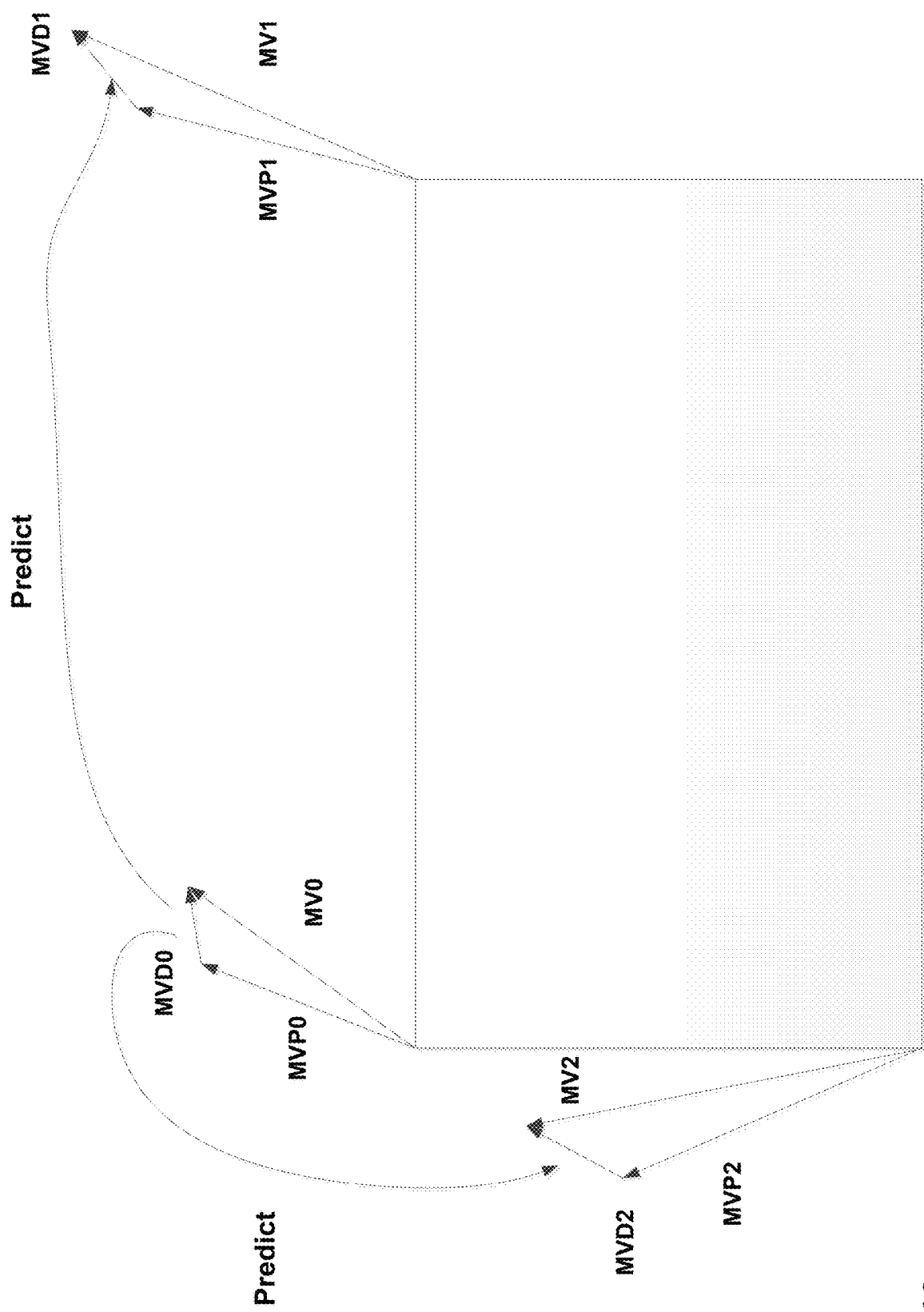
FIG. 10 is a conceptual diagram illustrating an example of MVD prediction for affine prediction with three motion vectors (six parameter affine prediction).

FIG. 10 is a conceptual diagram illustrating an example of MVD prediction for affine prediction with three motion vectors (six parameter affine prediction). For the six-parameter affine prediction, video encoder 20 and/or video decoder 30 may use the MVD of the first MV to predict the MVD of the second MV. Furthermore, video encoder 20 and/or video decoder 30 may use the MVD of the first MV to predict the MVD of the third MV in affine prediction with three motion vectors. FIG. 10 shows an example of MVD prediction for affine prediction with three motion vectors, where MVD1 is predicted by MVD0 and MVD2 is also predicted by MVD0.

Referring again to FIG. 6, in some examples, video encoder 20 and video decoder 30 may configured such that the first MV in the examples above is defined as the MV associated with the top-left control point denoted "MV0" in FIGS. 3, 9, and 10. Alternatively, video encoder 20 and video decoder 30 may be configured to adaptively select the first control point associated with the first MV. For example, the first control point may depend on coded information, such as block shape. Alternatively, video encoder 20 and video decoder 30 may implicitly derive the first control point associated with the first MV.

Additionally or alternatively, in some examples, video encoder 20 and/or video decoder 30 may be configured to apply MVD prediction between any two MVDs for affine prediction. For example, video encoder 20 and video decoder 30 may predict MVD0 from MVD1 for affine prediction with two motion vectors. In another example, video encoder 20 and video decoder 30 may predict MVD1 from MVD0, and predict MVD2 from MVD1, for affine prediction with three motion vectors.

Additionally or alternatively, in some examples, video encoder 20 and/or video decoder 30 may be configured to predict MVDa from MVDb. Video encode 20 may calculate MVDa'=MVDa−MVDb, and code information representing MVDa' as part of the bitstream, such that video decoder 30 may decode this information to determine MVDa'. Video decoder 30 may then calculate MVDa=MVDa'+MVDb. In one example, a=1 and b=0 for affine prediction with four parameters.

Additionally or alternatively, in some examples, video encoder 20 and/or video decoder 30 may be configured to predict MVDa from MVDb. Video encoder 20 may then calculate MVDa'=MVDa−w*MVDb, and code information representing MVDa' as part of the bitstream, such that video decoder 30 may decode this information to determine MVDa'. Video decoder 30 may then calculate MVDa=MVDa'+w*MVDb. In this example, w is a weighting value, such as 0.5. In one example, a=1 and b=0 for affine prediction with two parameters. This example can be implemented in an integer form, like MVD1'=MVD1−((MVD0+1)>>1) when w=0.5, or MVD1'=MVD1−((MVD0+2)>>2) when w=0.25. In one example, video encoder 20 encodes data representing w as part of the bitstream, e.g., at a sequence level (such as a sequence parameter set (SPS)), a picture level (such as a picture parameter set (PPS)), slice level (such as in a slice header), or block level (such as in a block header). Video decoder 30 may further extract this signaled information from the corresponding level of information.

Additionally or alternatively, in some examples, video encoder 20 and/or video decoder 30 may be configured to predict the MVD of one control point from MVDs of more than one other control point. For example, video encoder 20 and video decoder 30 may predict MVD2 from MVD0 and MVD1 in the six-parameter affine model. As an example, video encoder 20 may calculate MVD2'=MVD2−((MVD0+MVD1)>>1), and code information representing MVD2' as part of the bitstream, such that video decoder 30 may decode this information to determine MVD2'. Video decoder 30 may then use this information to calculate MVD2=MVD2'+((MVD0+MVD1)>>1).

Additionally or alternatively, in some examples, video encoder 20 and/or video decoder 30 may be configured to determine whether or not to predict an MVD based on an MVD value. For example, video encoder 20 may determine to predict MVDa from MVDb if |MVDb$^x$+MVDb$^y$|<T; otherwise, video encoder 20 does not predict MVDa from MVDb. In another example, video encoder 20 may determine to predict MVDa from MVDb if max(|MVDb$^x$|, |MVDb$^y$|)<T; otherwise, video encoder 20 does not predict MVDa from MVDb. In still another example, video encoder 20 may predict MVDa from MVDb if |MVDb$^x$+MVDb$^y$|>T; otherwise, video encoder 20 does not predict MVDa from MVDb. In still another example, video encoder 20 may predict MVDa from MVDb if min(|MVDb$^x$|, |MVDb$^y$|)>T; otherwise, video encoder 20 does not predict MVDa from MVDb. In the examples above, T represents a threshold, which can be a fixed number or signaled by video encoder 20 and decoded by video decoder 30. Video encoder 20 may encode data representing whether or not to predict MVDa from MVDb based on any of the example determinations above, and video decoder 30 may decode this encoded data to determine whether to predict MVDa from MVDb.

Additionally or alternatively, in some examples, video encoder 20 and/or video decoder 30 may be configured to predict the horizontal (x) and/or vertical (y) components of an MVD in different ways. For example, video encoder 20 and video decoder 30 may predict only the x component of MVDb from the x component of MVDa, but not predict the y component of MVDb from another MVD (e.g., MVDa).

Additionally or alternatively, in some examples, video encoder 20 and/or video decoder 30 may be configured to determine whether to predict the MVD based on the value of the MVP. For example, video encoder 20 may determine to predict MVDa from MVDb if |MVPa$^x$−MVPb$^x$|+|MVPa$^y$−MVPb$^y$|<S; otherwise, video encoder 20 does not predict MVDa from MVDb. In another example, video encoder 20 may determine to predict MVDa from MVDb if max(∥MVPa$^x$−MVPb$^x$|, |MVPa$^y$−MVPb$^y$|)<S; otherwise, video encoder 20 does not predict MVDa from MVDb. In the examples above, S represents a threshold, which can be a fixed number or signaled by video encoder 20 and decoded by video decoder 30. Video encoder 20 may encode data representing whether or not to predict MVDa from MVDb based on any of the example determinations above, and video decoder 30 may decode this encoded data to determine whether to predict MVDa from MVDb.

Additionally or alternatively, in some examples, video encoder 20 and/or video decoder 30 may be configured to determine whether to predict an MVD for a block predicted using affine prediction based on a motion prediction method. For example, if the MVP comes from the MVP derivation method in JEM as described above with respect to FIG. 3, video encoder 20 and video decoder 30 may determine not to use MVD prediction. As another example, if MVP comes from the MVP derivation method similar to affine merge as described above with respect to U.S. Provisional Application No. 62/404,719, video encoder 20 and video decoder 30 may determine to use MVD prediction. Additionally or alternatively, video encoder 20 and video decoder 30 may determine whether to use MVD prediction based on whether illumination compensation is used for the source block of the MVP.

Additionally or alternatively, in some examples, video encoder 20 and/or video decoder 30 may be configured to determine whether to predict an MVD based on a size and/or shape of a current block. For example, video encoder 20 and video decoder 30 may determine to use MVD prediction when W*H>T, where W represents a width of the current block, H represents a height of the current block, and T represents a threshold value. T may be a fixed number or signaled from video encoder 20 to video decoder 30 in the bitstream. In another example, video encoder 20 and video decoder 30 may determine to use MVD prediction when W*H<T.

Additionally or alternatively, in some examples, video encoder 20 and/or video decoder 30 may be configured to code data representing whether or not to predict an MVD (or a component thereof) in a bitstream. That is, video encoder 20 may encode data representing whether to predict either or both components (horizontal and vertical) of an MVD in the bitstream, and video decoder 30 may determine whether to predict either or both components of the MVD from the encoded data of the bitstream (by decoding the data).

Additionally or alternatively, in some examples, video encoder 20 and/or video decoder 30 may be configured to code data representing which control point(s) to use as reference for MVD prediction in the bitstream. That is, video encoder 20 may encode this data, and video decoder 30 may decode this data to determine which control point(s) to use as reference for MVD prediction.

Additionally or alternatively, in some examples, video encoder 20 and/or video decoder 30 may be configured to generate the MVP of a MV from the MVD of another MV in a block predicted using affine prediction.

Additionally or alternatively, in some examples, video encoder 20 and/or video decoder 30 may be configured to use the MVD of a first MV to generate the MVP(s) of one or more other MVs in affine prediction. In one example, video encoder 20 and video decoder 30 may use the MVD of the first MV to generate the MVP of the second MV in affine prediction (e.g., four-parameter affine). In another example, for six-parameter affine prediction, video encoder 20 and video decoder 30 may use the MVD of the first MV to generate the MVP of the second MV in affine prediction with three motion vectors. Additionally, video encoder 20 and video decoder 30 may use the MVD of the first MV to generate the MVP of the third MV in affine prediction with three motion vectors. Alternatively, video encoder 20 and video decoder 30 may use the MVD of the second MV to generate the MVP of the third MV in affine prediction with three motion vectors.

Additionally or alternatively, in some examples, video encoder 20 and/or video decoder 30 may be configured to generate MVP0 from MVD1 for affine prediction with two motion vectors. In another example, video encoder 20 and/or video decoder 30 may be configured to generate MVP1 from MVD0, and to generate MVP2 from MVD1, for affine prediction with three motion vectors.

Additionally or alternatively, in some examples, video encoder 20 and/or video decoder 30 may be configured to calculate MVPa according to MVPa=MVP'a+MVDb. MVP'a represents the MVP generated in the original way without considering MVDb as described above for AMVP and merge mode for affine prediction. In one example, a=1 and b=0 for affine prediction with four parameters (two motion vectors).

Additionally or alternatively, in some examples, video encoder 20 and/or video decoder 30 may be configured to calculate MVPa according to MVPa=MVP'a+w*MVDb, where w is a weighting value, such as 0.5. In this example, MVP'a is the MVP generated in the original way without considering MVDb as described above for AMVP and merge mode for affine prediction. In one example, a=1 and b=0 for affine prediction with two parameters. This example can be implemented in an integer form, like MVP1=MVP'1+((MVD0+1)>>1) when w=0.5, or MVP1=MVP'1+((MVD0+2)>>2) when w=0.25. In one example, video encoder 20 determines w and signals the value of w in the bitstream at sequence level, picture level, slice level, or block level. Video decoder 30, accordingly, would decode the value of w from the appropriate level of information.

Additionally or alternatively, in some examples, video encoder 20 and/or video decoder 30 may be configured to generate the MVP of one control point from MVDs of multiple other control points. For example, video encoder 20 and/or video decoder 30 may generate MVP2 from MVD0 and MVD1 in the six-parameter affine model. Video encoder 20 and/or video decoder 30 may calculate MVP2 as MVP2=MVP'2+((MVD0+MVD1)>>1).

Additionally or alternatively, in some examples, video encoder 20 and/or video decoder 30 may be configured to use the MV of one control point to generate the MVP(s) of the MV(s) of one or more other control point(s) in a block predicted using affine prediction. In one example, video encoder 20 and/or video decoder 30 may use the first MV to generate the MVP of the second MV in affine prediction (e.g., four-parameter affine). In another example, for the six-parameter affine prediction, video encoder 20 and/or video decoder 30 may use the first MV to generate the MVP of the second MV in affine prediction with three motion vectors, and use the first MV to generate the MVP of the third MV in affine prediction with three motion vectors. Alternatively, for the six-parameter affine prediction, encoder 20 and/or video decoder 30 may use the second MV to generate the MVP of the third MV in affine prediction with three motion vectors.

Additionally or alternatively, in some examples, video encoder 20 and/or video decoder 30 may be configured to calculate MVPa as MVPa=(MVP'a+MVb)>>1. MVP'a is the MVP generated in the original way without considering MVb as described above in the sections discussing AMVP and merge for affine prediction. In one example, a=1 and b=0 for affine prediction with four parameters.

Additionally or alternatively, in some examples, video encoder 20 and/or video decoder 30 may be configured to calculate MVPa as MVPa=w1*MVP'a+w2*MVb. In this example, w1 and w2 are weighting values that may have the same or different values, e.g., w1=w2=0.5. MVP'a is the MVP generated in the original way without considering MVb as described in the sections above on AMVP and merge mode for affine prediction. In one example, a=1 and b=0 for affine prediction with four parameters. This example can be implemented in an integer form, like MVP1=(3*MVP'1+MV0+2)>>2 when w1=0.75 and w2=0.25. In one example, video encoder 20 encodes data for w1 and w2 in the bitstream at any of sequence level, picture level, slice level, or block level. Likewise, video decoder 30 would determine w1 and w2 by decoding this data at the appropriate level.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 7:
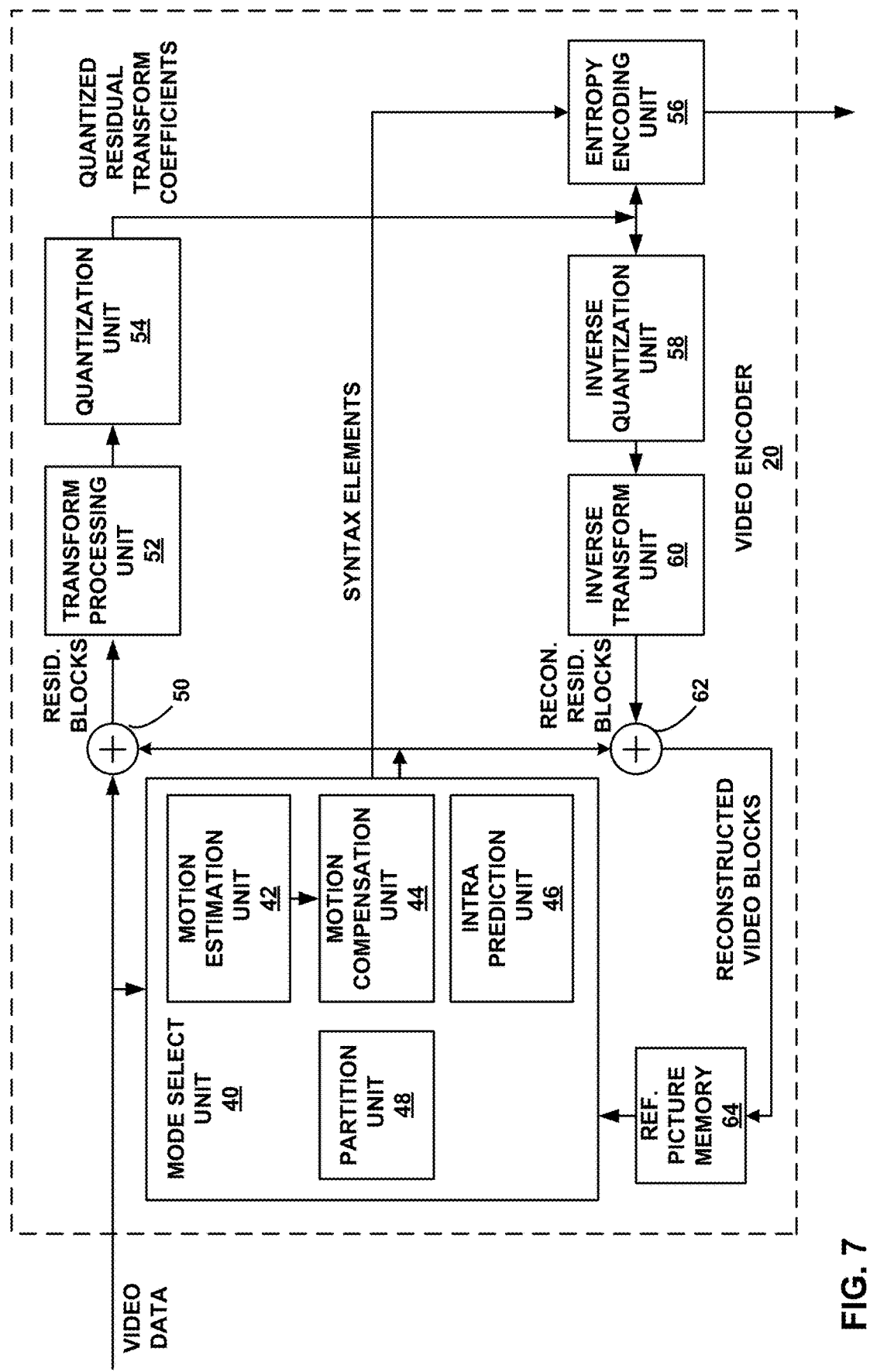
FIG. 7 is a block diagram illustrating an example of a video encoder that may implement techniques of this disclosure for encoding affine prediction motion information.

FIG. 7 is a block diagram illustrating an example of video encoder 20 that may implement techniques of this disclosure for encoding affine prediction motion information. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 7, video encoder 20 receives a current video block within a video frame to be encoded. In the example of FIG. 7, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 7) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Motion compensation unit 44 may generate a prediction block using the motion vectors, which may include interpolating or otherwise mathematically manipulating values of the predictive blocks referred to by the motion vectors. Mode select unit 40 may also generate syntax elements associated with the video blocks and the video slice for use by video decoder 30 in decoding the video blocks of the video slice.

Video encoder 20 may be configured to perform any of the various techniques of this disclosure discussed above with respect to FIG. 6. For example, motion compensation unit 44 may be configured to code motion information for a block of video data using AMVP or merge mode in accordance with HEVC, and/or may be configured to code affine motion information or a block of video data using affine inter mode or affine merge mode in accordance with the techniques of this disclosure.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56 the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 8:
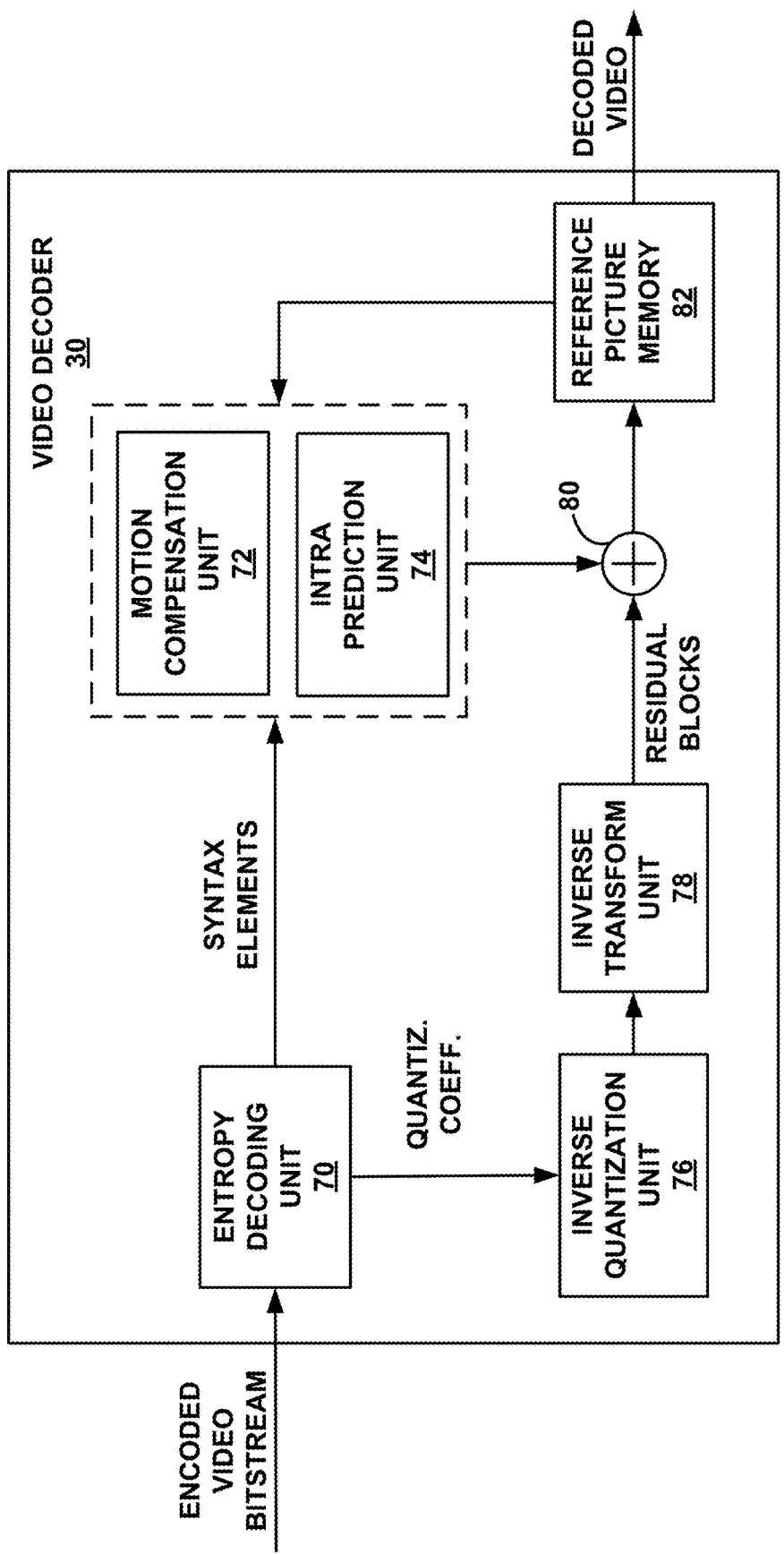
FIG. 8 is a block diagram illustrating an example of video decoder 30 that may implement techniques of this disclosure for decoding affine prediction motion information.

FIG. 8 is a block diagram illustrating an example of video decoder 30 that may implement techniques of this disclosure for decoding affine prediction motion information. In the example of FIG. 8, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 7). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Video decoder 30 may be configured to perform any of the various techniques of this disclosure discussed above with respect to FIG. 6. For example, motion compensation unit 72 may be configured to perform motion vector prediction using AMVP or merge mode in accordance with HEVC, and/or may be configured to perform affine motion information or a block of video data using affine inter mode or affine merge mode in accordance with the techniques of this disclosure. Entropy decoding unit 70 may decode one or more syntax elements representing how motion information (e.g., affine motion information) is coded for the current block.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 6.

Figure 11:
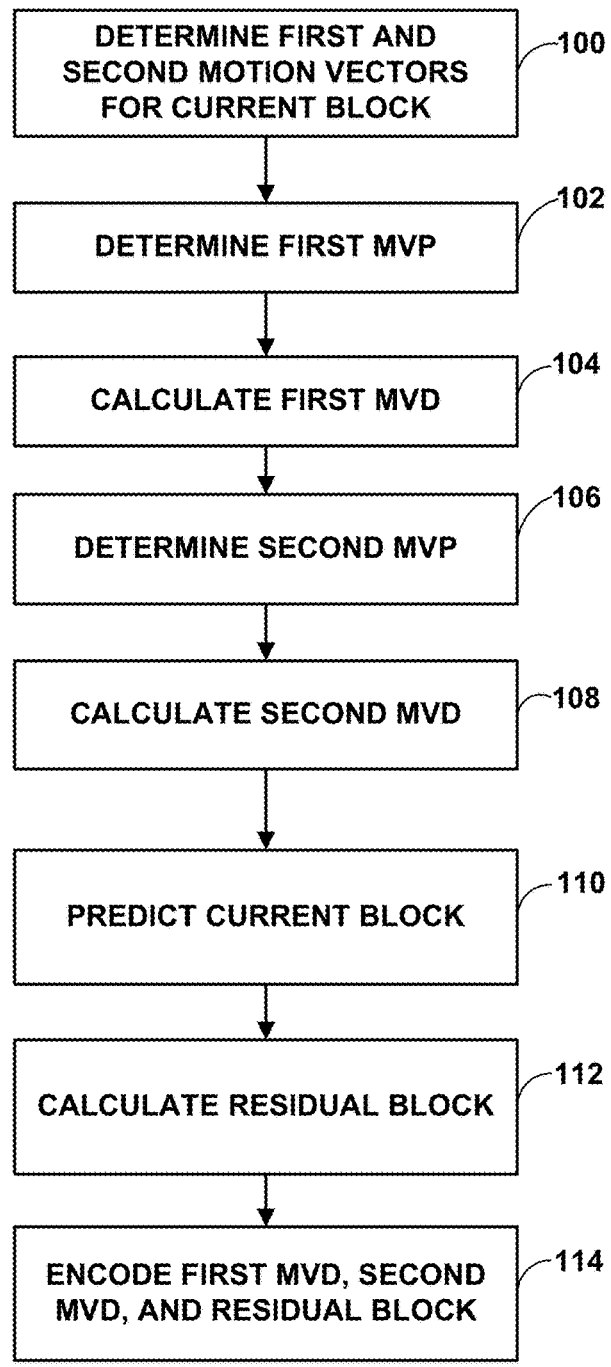
FIG. 11 is a flowchart illustrating an example method for encoding a current block of video data according to the techniques of this disclosure.

FIG. 11 is a flowchart illustrating an example method for encoding a current block of video data according to the techniques of this disclosure. For purposes of example and explanation, the method of FIG. 11 is explained with respect to video encoder 20 of FIGS. 6 and 7. However, it should be understood that other devices may be configured to perform this or a similar method.

Initially, although not shown in FIG. 11, mode select unit 40 may determine a prediction mode to be used to predict a current block. In this example, it is assumed that mode select unit 40 selects an affine prediction mode, which includes prediction using at least two motion vectors. Thus, mode select unit 40 causes motion estimation unit 42 to perform a motion search to determine a first motion vector and a second motion vector (100). Mode select unit 40 may compare rate-distortion results between a variety of prediction methods, such as intra-prediction, inter-prediction, and affine prediction, and determine that affine prediction results in the best rate-distortion results among the various tested prediction modes.

After motion estimation unit 42 determines the first and second motion vectors, video encoder 20 may calculate a first motion vector predictor (MVP) (102) for the first motion vector. The first MVP may correspond to a motion vector of a neighboring block. Video encoder 20 may then calculate a first motion vector difference (MVD) as the difference between the first motion vector and the first motion vector predictor (104). In particular, video encoder 20 may calculate differences between both x- and y-components of the motion vector and the MVD, respectively.

Video encoder 20 may then determine a second MVP (106) for the second motion vector. Video encoder 20 may further calculate a second MVD (108) as the difference between the second motion vector and the second MVD.

Motion compensation unit 44 may also predict the current block (110) using affine prediction to generate a prediction block for the current block. Although two motion vectors were discussed for purposes of example, it should be understood that three motion vectors may be used for affine prediction to generate the prediction block. Likewise, video encoder 20 may generate a third MVD and a third MVP according to the techniques of this disclosure for a third motion vector, as discussed above.

After generating the prediction block, video encoder 20 may calculate a residual block (112) representing pixel-by-pixel differences between the current block and the prediction block. In particular, summer 50 may calculate the pixel-by-pixel differences between the current block and the prediction block. Video encoder 20 may then encode the first MVD, the second MVD, and the residual block (114) to encode the current block. That is, in accordance with the techniques of this disclosure, video encoder 20 may encode the first MVD using, e.g., motion vector prediction techniques, such as merge mode or AMVP mode, and encode the second MVD by predicting the second MVD from the first MVD. Thus, to encode the second MVD, video encoder 20 may encode data representative of a difference between the first MVD and the second MVD, such as differences between x- and y-components of the first MVD and the second MVD. To encode the residual block, transform processing unit 52 may transform the residual block, quantization unit 54 may quantize transform coefficients of the resulting transform block, and entropy encoding unit 56 may entropy encode the resulting quantized transform coefficients.

In this manner, the method of FIG. 11 represents an example of a method including coding (namely, encoding) a first motion vector difference (MVD) representing a difference between a first motion vector of a current block of video data predicted using affine prediction and a first motion vector predictor (MVP) for the first motion vector; predicting a second MVD from the first MVD for a second motion vector of the current block; and coding (namely, encoding) the current block using affine prediction according to the first motion vector and the second motion vector. By performing the method of FIG. 11, video encoder 20 may generate a bitstream that is more bandwidth-efficient than when performing previous techniques, because the data representing the second MVD may be smaller because the second MVD is predicted from the first MVD.

Figure 12:
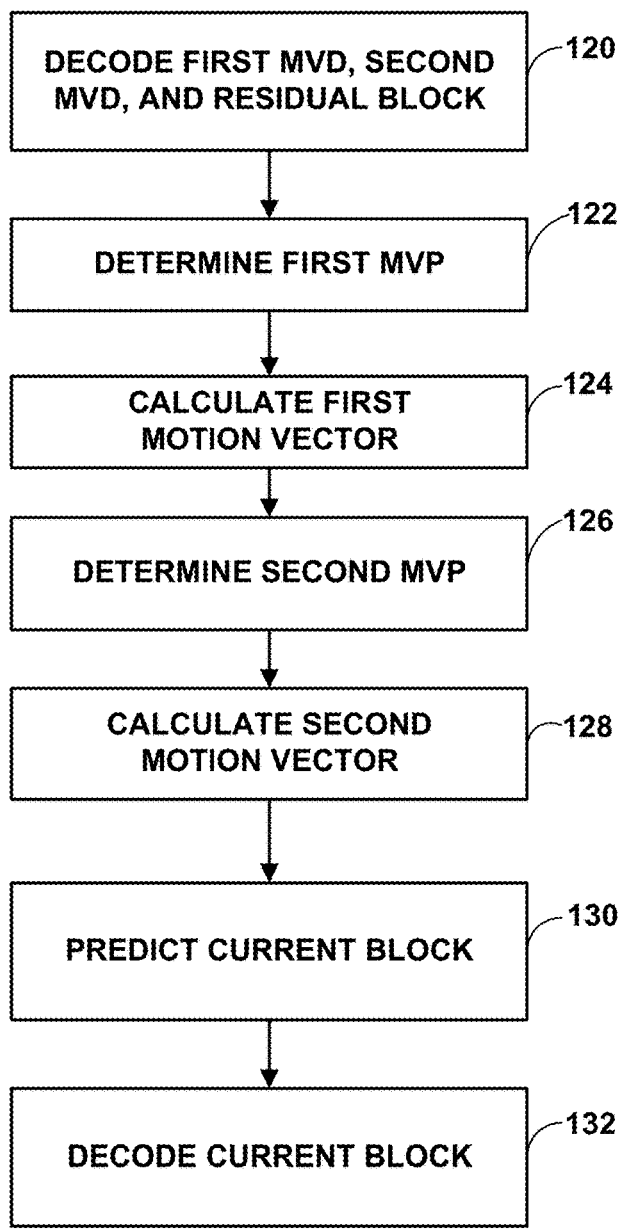
FIG. 12 is a flowchart illustrating an example method of decoding a current block of video data according to the techniques of this disclosure.

FIG. 12 is a flowchart illustrating an example method of decoding a current block of video data according to the techniques of this disclosure. The method of FIG. 12 is explained with respect to video decoder 30 of FIGS. 6 and 8 for purposes of example. However, it should be understood that other devices may be configured to perform the techniques of this or a similar method.

Video decoder 30 may decode a first motion vector difference (MVD), a second MVD, and a residual block (120) of a current block. That is, in accordance with the techniques of this disclosure, video decoder 30 may decode the first MVD using, e.g., motion vector prediction techniques, such as merge mode or AMVP mode, and decode the second MVD by predicting the second MVD from the first MVD. Thus, to decode the second MVD, video decoder 30 may decode data representative of a difference between the first MVD and the second MVD, such as differences between x- and y-components of the first MVD and the second MVD. To decode the residual block, entropy decoding unit 70 may entropy decode quantized transform coefficients, inverse quantization unit 76 may inverse quantize the transform coefficients, and inverse transform unit 78 may inverse transform the transform coefficients to reproduce the residual block.

Motion compensation unit 72 may then determine a first motion vector predictor (MVP) (122) for a first motion vector of the current block and calculate the first motion vector (124) from the first MVP. In particular, motion compensation unit 72 may add the first MVD to the first MVP to calculate the first motion vector. Motion compensation unit 72 may similarly determine a second MVP (126) for a second motion vector of the current block and calculate the second motion vector (128) from the second MVP. In particular, motion compensation unit 72 may add the second MVD to the second MVP to calculate the second motion vector. In some examples, a third motion vector may be included, in which case entropy decoding unit 70 may entropy decode data representing a difference between, e.g., the first MVD and a third MVD for the third motion vector, and motion compensation unit 72 may calculate the third motion vector from the third MVD and a third MVP in a similar manner.

Motion compensation unit 72 may then predict the current block (130), e.g., according to affine motion prediction using the first and second (and potentially third) motion vectors. Video decoder 30 may then decode the current block (132), e.g., by causing summer 80 to add the values of the prediction block to the values of the residual block on a pixel-by-pixel basis.

In this manner, the method of FIG. 12 represents an example of a method including coding (namely, decoding) a first motion vector difference (MVD) representing a difference between a first motion vector of a current block of video data predicted using affine prediction and a first motion vector predictor (MVP) for the first motion vector; predicting a second MVD from the first MVD for a second motion vector of the current block; and coding (namely, decoding) the current block using affine prediction according to the first motion vector and the second motion vector. By performing the method of FIG. 12, video decoder 30 may decode a bitstream that is more bandwidth-efficient than when performing previous techniques, because the data representing the second MVD may be smaller because the second MVD is predicted from the first MVD.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of coding video data, the method comprising:
coding a first motion vector difference (MVD) representing a first difference between a first motion vector of a current block of video data predicted using affine prediction and a first motion vector predictor (MVP) for the first motion vector;
predicting a second MVD from the first MVD for a second motion vector of the current block, the second MVD representing a second difference between the second motion vector and a second MVP for the second motion vector, the second motion vector being different than the first motion vector; and
coding the current block using affine prediction according to the first motion vector and the second motion vector.
2. The method of claim 1, wherein the first MVD includes a horizontal component (MVDx1) and a vertical component (MVDy1), the first MVP includes a horizontal component (MVPx1) and a vertical component (MVPy1), the first motion vector includes a horizontal component (MVx1) and a vertical component (MVy1), MVDx1=MVx1−MVPx1, and MVDy1=MVy1−MVPy1.
3. The method of claim 1, wherein coding the current block comprises coding the current block according to a four-parameter affine model.
4. The method of claim 1, further comprising predicting a third MVD from at least one of the first MVD or the second MVD for a third motion vector of the current block, wherein coding the current block comprises coding the current block using affine prediction according to the first motion vector, the second motion vector, and the third motion vector.
5. The method of claim 4, wherein coding the current block comprises coding the current block according to a six-parameter affine model.
6. The method of claim 1, wherein the first motion vector originates from an upper-left corner of the current block, and wherein the second motion vector originates from an upper-right corner of the current block.
7. The method of claim 1, further comprising coding data defining control points for the first motion vector and the second motion vector.

8. The method of claim 1, further comprising determining control points for the first motion vector and the second motion vector based on a shape of the current block.
9. The method of claim 1, further comprising implicitly deriving control points for the first motion vector and the second motion vector.
10. The method of claim 1, further comprising coding data representing MVD'2 for the second MVD, wherein MVD'2 represents a residual value for the second MVD relative to the first MVD.
11. The method of claim 10, wherein the first MVD is MVD1, the second MVD is MVD2, w is a weighting value, and MVD'2=MVD1−w*MVD2.
12. The method of claim 10, wherein the first MVD is MVD1, the second MVD is MVD2, and MVD'2=MVD2−((MVD1+1)>>1) for a weighting value of 0.5, wherein ">>" is a bitwise right-shift operator.
13. The method of claim 10, wherein the first MVD is MVD1, the second MVD is MVD2, and MVD'2=MVD2−((MVD1+2)>>2) for a weighting value of 0.25, wherein ">>" is a bitwise right-shift operator.
14. The method of claim 1, further comprising determining to predict the second MVD from the first MVD, wherein predicting the second MVD from the first MVD comprises predicting the second MVD from the first MVD in response to determining to predict the second MVD from the first MVD.
15. The method of claim 14, wherein determining to predict the second MVD from the first MVD comprises determining to predict the second MVD from the first MVD based on a shape of the current block.
16. The method of claim 14, wherein determining to predict the second MVD from the first MVD comprises determining to predict the second MVD from the first MVD based on a motion prediction method for the current block.
17. The method of claim 16, wherein determining to predict the second MVD from the first MVD comprises determining that the motion prediction method is an affine merge mode.
18. The method of claim 1, wherein the second MVD includes a horizontal component ($MVD2^x$) and a vertical component ($MVD2^y$), and wherein predicting the second MVD comprises predicting $MVD2^x$ differently than predicting $MVD2^y$.
19. The method of claim 1, further comprising generating a third MVP for a third motion vector of the current block from at least one of the first MVD or the second MVD.
20. The method of claim 1, wherein the first MVD is MVD1, the method further comprising:
determining a second intermediate MVP (MVP'2) for the second motion vector from a motion vector of one or more neighboring blocks to the current block; and
generating the second MVP (MVP2) for the second motion vector from MVP'2 and MVD.
21. The method of claim 1, further comprising generating the second MVP for the second motion vector from the first MVD and a third MVD for a third motion vector of the current block, wherein the second MVP is MVP2, the first MVD is MVD1, the third MVD is MVD3, the method further comprising determining a second intermediate MVP (MVP'2) for the second motion vector from a motion vector of one or more neighboring blocks to the current block, wherein generating MVP2 comprises generating MVP2 as MVP2=MVP'2+((MVD1+MVD3)>>1), wherein ">>" is a bitwise right-shift operator.
22. The method of claim 1, wherein coding the current block comprises decoding the current block, comprising:

adding the first MVD to the first MVP to reconstruct the first motion vector;
determining the second MVP for the second motion vector;
reconstructing the second MVD using the prediction from the first MVD;
adding the second MVD to the second MVP to reconstruct the second motion vector;
forming a prediction block for the current block using the first motion vector and the second motion vector;
decoding a residual block for the current block; and
adding the residual block and the prediction block to reconstruct the current block.

23. The method of claim 1, wherein coding the current block comprises encoding the current block, comprising:
subtracting the first MVP from the first motion vector to generate the first MVD;
determining the second MVP for the second motion vector;
subtracting the second motion vector from the second MVP to generate the second MVD;
encoding the first MVD;
encoding data representative of the second MVD predicted from the first MVD;
forming a prediction block for the current block using the first motion vector and the second motion vector;
subtracting the prediction block from the current block to generate a residual block; and
encoding the residual block.

24. A device for coding video data, the device comprising:
a memory configured to store video data; and
one or more processors implemented in circuitry and configured to:
code a first motion vector difference (MVD) representing a difference between a first motion vector of a current block of video data predicted using affine prediction and a first motion vector predictor (MVP) for the first motion vector;
predict a second MVD from the first MVD for a second motion vector of the current block, the second MVD representing a second difference between the second motion vector and a second MVP for the second motion vector, the second motion vector being different than the first motion vector; and
code the current block using affine prediction according to the first motion vector and the second motion vector.

25. The device of claim 24, wherein the one or more processors are configured to:
add the first MVD to the first MVP to reconstruct the first motion vector;
determine the second MVP for the second motion vector;
reconstruct the second MVD using the prediction from the first MVD;
add the second MVD to the second MVP to reconstruct the second motion vector;
form a prediction block for the current block using the first motion vector and the second motion vector;
decode a residual block for the current block; and
add the residual block and the prediction block to reconstruct the current block.

26. The device of claim 24, wherein the one or more processors are configured to:
subtract the first MVP from the first motion vector to generate the first MVD;
determine the second MVP for the second motion vector;
subtract the second motion vector from the second MVP to generate the second MVD;
encode the first MVD;
encode data representative of the second MVD predicted from the first MVD;
form a prediction block for the current block using the first motion vector and the second motion vector;
subtract the prediction block from the current block to generate a residual block; and
encode the residual block.

27. The device of claim 24, further comprising a display configured to display decoded video data.

28. The device of claim 24, wherein the device comprises one or more of a camera, a computer, a mobile device, a broadcast receiver device, or a set-top box.

29. A non-transitory computer-readable storage medium having stored thereon instructions that, when executed, cause a processor of a device for coding video data to:
code a first motion vector difference (MVD) representing a difference between a first motion vector of a current block of video data predicted using affine prediction and a first motion vector predictor (MVP) for the first motion vector;
predict a second MVD from the first MVD for a second motion vector of the current block, the second MVD representing a second difference between the second motion vector and a second MVP for the second motion vector, the second motion vector being different than the first motion vector; and
code the current block using affine prediction according to the first motion vector and the second motion vector.

30. A device for coding video data, the device comprising:
means for coding a first motion vector difference (MVD) representing a difference between a first motion vector of a current block of video data predicted using affine prediction and a first motion vector predictor (MVP) for the first motion vector;
means for predicting a second MVD from the first MVD for a second motion vector of the current block, the second MVD representing a second difference between the second motion vector and a second MVP for the second motion vector, the second motion vector being different than the first motion vector; and
means for coding the current block using affine prediction according to the first motion vector and the second motion vector.

* * * * *